Figure 1:
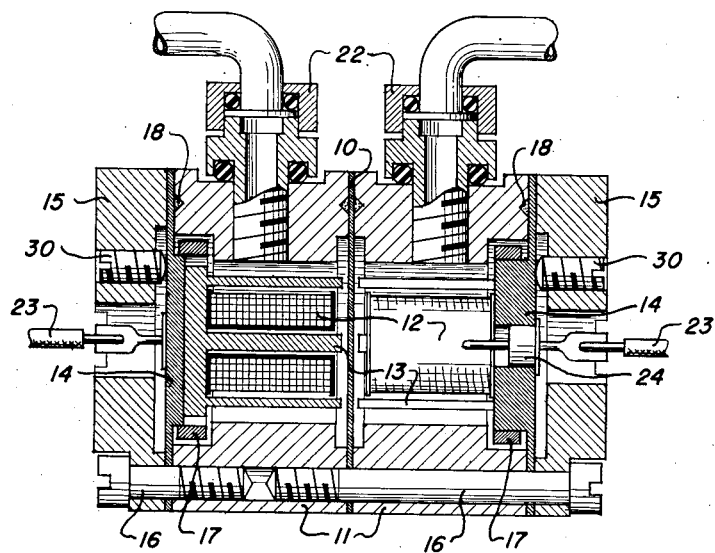

May 30, 1961 P. K. CHURCH ET AL 2,986,715
TRANSDUCER ADJUSTING MEANS
Filed Feb. 16, 1959

INVENTORS:
Peter K. Church
Douglas H. Courter
BY
Edward L. Amonette
AGENT

United States Patent Office 2,986,715
Patented May 30, 1961

2,986,715
TRANSDUCER ADJUSTING MEANS
Peter K. Church and Douglas H. Courter, Albuquerque, N. Mex., assignors to Ultradyne, Incorporated, Albuquerque, N. Mex., a corporation of New Mexico
Filed Feb. 16, 1959, Ser. No. 793,572
16 Claims. (Cl. 336—30)

This invention relates to measuring devices, and more particularly to those devices employing variable reluctance magnetic circuits.

There are many such devices on the market, such as accelerometers, load cells, vibration transducers, angular position transducers, linear displacement transducers, and others, all of which utilize a magnetic diaphragm which is separated from a magnetic core by a space gap, the thickness of which is critical. Usually an electrical coil is associated with the core and is excited by an electrical current. As the diaphragm is moved in response to the particular phenomenon being measured, the spacing between it and the core is varied, thus varying the reluctance of the magnetic circuit and the impedance seen by the electrical signal. In this manner the electrical signal is varied in response to the applied phenomenon and may be applied to a suitable indicating instrument.

It is seen that, since the spacing between the diaphragm and the core has a marked affect on the electrical signal, it is necessary that the initial spacing be very accurately set. Otherwise, the transducer impedance will not lie within the prescribed tolerances to produce the desired results. Many of the instruments rely on a diaphragm movement of only a few thousandths of an inch to produce the full-scale signal deviation, which means that the initial spacing adjustment must be made to within a fraction of a thousandth of an inch in order to produce the desired accuracy of results.

If a core is used having more than one arm projecting toward the diaphragm, it is necessary that each arm be equally spaced from the diaphragm. Otherwise, harmonic distortion and/or non-linearity of the output signal will occur. In the case of dual coil transducers, i.e., those which have a core and coil located on each side of the diaphragm, it is often necessary that the diaphragm be accurately centered between the two cores before the application of force, so that equal output signals will be obtained when the diaphragm is deflected the same distance either side of its null position. In other cases it is necessary that the diaphragm be off center before the application of pressure so that application of a prescribed force centers the diaphragm and balances the coil impedances. In the case of single-coil transducers, which are frequently used as part of a frequency-determining circuit, the spacing between the core and the diaphragm must be correct to obtain the required impedance change with pressure to yield the desired change in frequency.

In the prior art the parts of the transducer have been accurately machined to maintain as close a spacing as possible between the diaphragm and the core. The core was then fastened to a larger supporting piece and the various pieces of the transducer screwed or bolted together with the diaphragm fixed in its relationship to the core. The difficulty with this type of operation is that there is no provision for adjustment of the spacing. Once the transducer is assembled and tested and found to have incorrect spacing, it has been necessary to disassemble the instrument and either remove enough material from the mating pieces or insert shims to decrease or increase the spacing desired. This assembly and disassembly operation frequently must be repeated several times if the machining is not performed to a high degree of accuracy. This is an expensive and time consuming manufacturing procedure and results in many rejected parts and in a high cost to the ultimate user.

Another type of adjustment found in the prior art consists of threading the piece which supports the core and coil, so that by rotating the supporting piece it is screwed in or out relative to the diaphragm, thus adjusting the core relative to the diaphragm. There are several disadvantages to this type of arrangement. If an E-shaped core is used in a dual coil transducer there will be only one position of the adjustable portion which aligns the two cores with each other. Since such alignment is generally necessary to the proper functioning of the instrument, the adjustment is practically useless. A disadvantage found in the adjustment, regardless of the type of transducer involved, is that there is always a certain amount of backlash present even though the threads are very accurately machined, so that a really accurate adjustment is impossible.

Sometimes the spacing adjustment is accomplished by shimming alone without too much attention being paid to the accuracy of machining. In that case, the adjustment is trial and error, since the transducer must be assembled, and the assembly screws tightened before it is known just what the spacing has turned out to be. If it is wrong, disassembly is necessary, with a changing of shims and reassembly. This results in a high labor cost and a high selling cost for the instrument.

This invention has been designed to eliminate the above defects of the prior art methods, by providing an externally controllable means for adjusting the spacing between the core and the diaphragm without disassembly of the transducer. Briefly, the invention includes a deformable platform upon which is mounted the core and its coil and which is clamped at its periphery to form an integral unit with the diaphragm. A rigid backing plate holds one or more adjusting screws which, when adjusted to bear against the platform, move the central portion of the platform and the core relative to the diaphragm, thus adjusting the space gap between the core and the diaphragm. If the core has only a single arm, a single adjusting screw located behind that arm is sufficient to adjust the spacing. Also, a single screw is all that is necessary if the core has multiple arms and if equal spacing for each arm is not necessary. When equal spacing is desirable, a pair of adjusting screws may be provided, preferably in the same plane as the arms of the core.

By using an adjusting screw or screws, continuous resolution of movement is obtained, rather than having to move in steps as is the case with adjustment by shimming. Since the core is not rotated during adjustment, there is no problem in keeping the two cores of a dual coil instrument in alignment. The overall length of the instrument does not vary with the degree of adjustment as it would were the core screwed in and out to adjust the spacing. The compact arrangement of adjusting screws and deformable platform has another advantage in that there always is pressure against the screws from the platform, so that backlash is eliminated.

As applied to pressure transducers, the adjusting means is particularly advantageous because the interior pressure chambers of the transducer may be sealed and tested for leaks prior to adjusting the spacing, no teardown being necessary if the spacing is found to be in error. This is very important where the transducers have one chamber evacuated to provide an absolute pressure measurement. Under the prior art methods, re-evacuation is necessary every time the spacing is changed. Absolute pressure transducers present another problem where the old threaded type of adjustment is used, since the threads must be sealed to hold the vacuum—a very difficult process.

Compensation for space gap changes due to expansion or contraction of transducer parts with changes in temperature has long been a problem in the manufacture of transducers. The present invention helps this problem also, since the adjusting screws may be made of different materials having different temperature coefficients of expansion. Thus if temperature changes are found to change the space gap in one direction, a material may be chosen for the adjusting screws which will change their dimensions with temperature in a direction to compensate for the gap change, keeping it constant over a wide range of temperatures. Adjusting screws made of different materials may be interchanged to vary the compensation without disassembling the transducer.

Since the invention is applicable to such a wide range of transducers, precluding presentation of a complete description of all applications herein, the following detailed description has been limited to a pressure transducer which incorporates the invention. It must be realized, however, that the invention is not limited thereto, but is valuable in connection with all kinds of transducers or other instruments requiring the type of adjustment herein presented. Further details of a pressure transducer of the same general type shown are found in patent application Serial No. 646,891, filed March 18, 1957, in the name of Phillip L. Jessen and entitled "Electromagnetic Pressure Transducer," now issued Patent No. 2,884,608, dated April 28, 1959.

Figure 2:
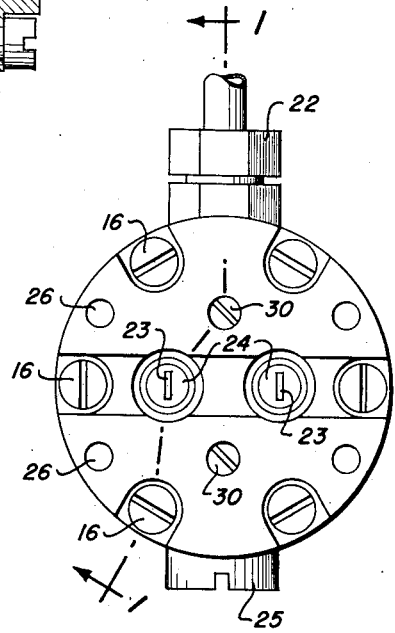
Figure 3:
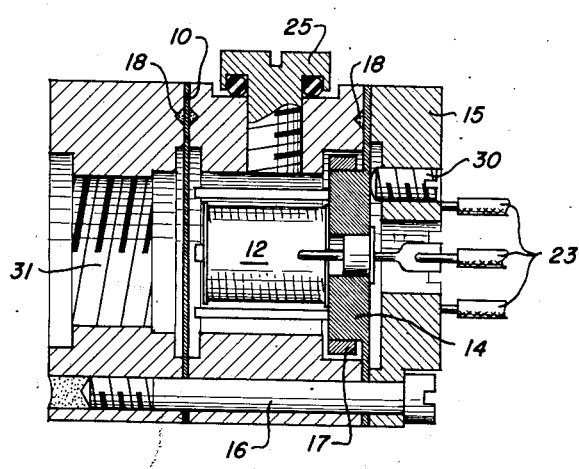

A better understanding of the invention and of its various advantages may be had by reading the more detailed description to follow, in conjunction with the attached drawing in which: Figure 1 is a longitudinal view of a dual coil pressure transducer embodying a preferred version of the invention, taken generally along the line 1—1 of Figure 2; Figure 2 is an end view of the embodiment of Figure 1; Figure 3 is a longitudinal sectional view of a single coil pressure transducer embodying the preferred version of the invention.

Referring now to Figures 1 and 2, magnetic diaphragm 10 is seen to be supported at its periphery by the two halves of metallic case 11. Electrical coils 12 are supported by and surround the central arms of their respective E-shaped cores 13. Each core is securely held at its base by a platform 14.

Each platform is seen to have a thick rigid central portion which supports the E core, and a much thinner deformable outer portion which is firmly clamped between a case half and a rigid backing plate 15. Screws 16 hold the transducer assembly, backing plates 15, platforms 14, diaphragm 10, and case halves 11 together as an integral unit. Clamping ring 17 fits tightly around the rigid inner portion of platform 14 and retains E core 13.

In order to accurately measure the difference between pressures occuring on either side of the diaphragm, it is necessary that the various parts of the transducer be sealed before they are joined at their peripheries. This is accomplished by means of circular grooves 18 which are filled with solder or other sealant during construction of the transducer. A fluid-tight seal thus is provided around the chambers occupied by the cores and their coils. Fluids are conducted to the interior chambers by means of tubing connected to the transducer by pressure fittings 22 which are screwed into suitable pressure ports in the case halves. Two pairs of oppositely located ports are provided for convenience in setting up several porting arrangements. A port plug 25 may be inserted in any unused port.

Electrical connections to the coils 12 are made by way of electrical terminals 23. The terminals are insulated from the platforms in which they are mounted, by means of glass seals 24. External circuitry not shown may be connected to termnials 23 for exciting the coils and for observing the output signal or changes in coil impedance. Threaded holes 26 are provided in each end of the transducer for convenient mounting on equipment associated with the pressure measurement.

A pair of adjusting screws 30 are shown threaded through each rigid backing plate 15 and controlled from outside the transducer by a screwdriver. The adjusting screws are located to be coplanar with the E core and they bear against the central rigid portion of platform 14. These screws may be located anywhere in connection with the rigid portion, but must not bear against the outer deformable portion of the platform or deformation would occur without lateral movement of the central portion. Although two adjusting screws are shown in each end of the transducer, it is obvious that if only lateral movement of the core is desired, only one adjusting screw is necessary, to be located in line with the central leg of the E core. Then adjustment of a single screw will, by controlling the deformation of platform 14, adjust the spacing between the E core and the diaphragm.

It has been found through experience that deformation of the platform by means of the adjusting screws results in a tendency to spread the groove in the rigid portion which holds the core, resulting in a loosening of the core. Clamping ring 17 prevents this from occurring by firmly holding the groove to its original dimensions, regardless of spreading forces due to pressure from the adjusting screws.

In the dual coil transducer shown in Figures 1 and 2 the required output signal at the null position of the diaphragm is obtained by adjusting both screws on one end of the transducer an equal amount, thus moving the three legs of the E core 13 an equal distance. The linearity of the output signal as related to applied pressure may be adjusted by moving the adjusting screws on both ends of the transducer an equal amount. Adjusting the relative spacings between end arms of the particular core and the diaphragm is accomplished by adjusting one screw more than its mate in the same end of the transducer, thus tilting the E core with respect to the diaphragm. This will equalize the spacings between the two outer legs of the core and the diaphragm or may be used to unbalance these spacings.

Transducers are frequently used under extreme conditions of vibration and shock. The adjustable means shown herein is particularly immune to shock and vibration because of the fact that the combination of a stressed spring and mechanical back stops is provided. When adjusting screws 30 are depressed against platform 14, there is a bending action in the deformable outer portion of the platform such as is found in leaf spring. The adjusting screws prevent return of the platform and may be cemented in place to assure that they will not loosen under vibration.

The single coil transducer shown in Figure 3 has essentially the same parts as the dual coil embodiment of Figures 1 and 2. The main difference in construction is that port 31 is provided in one end of the transducer for admission of a fluid. The port plug 25 is shown in place in the reference port of a transducer but may be removed and replaced by a pressure fitting 22 as shown in Figure 1. As before, adjusting screws 30 provide the spacing adjustments in the transducer.

A novel externally controllable adjusting means has been described in connection with a pressure transducer. Incorporated with the other parts of the transducer, the adjusting means cooperates in providing a novel pressure transducer. Although machining of mating parts is still required, the use of the adjusting means makes possible more relaxed manufacturing tolerances and the sensitive final calibration of a transducer can be adjusted externally. Numerous teardowns, installation of shims, and re-tooling of assembled parts are avoided by use of the means shown. Recalibration of units may be accomplished after extended usage by use of the adjusting means. The transducer thus may be returned to its original calibrated conditions without the necessity of disassembling and rebuilding. The embodiments shown and described are merely for illustrative purposes and are not meant to limit the invention, the bounds of which are drawn by the claims below.

What is claimed is:

1. In a transducer having an electromagnetic coil wound on a magnetic core which is separated from a magnetic diaphragm by a space gap, said core, diaphragm and space gap forming a magnetic circuit, means for externally adjusting the core relative to the diaphragm and thereby changing the width of the space gap and the impedance of the core, comprising: a deformable platform supporting the core near the center of one platform surface; a rigid backing plate located against a peripheral surface of the platform opposite the core-supporting surface; means for integrally supporting the platform, backing plate and diaphragm at their peripheries; and externally controllable means for adjusting a central portion of the platform relative to the backing plate whereby the spacing between the core and the diaphragm is adjusted.

2. The adjusting means of claim 1, wherein the platform has a deformable outer portion and a rigid central portion.

3. The adjusting means of claim 2, wherein the rigid central portion of the platform is noticeably smaller in diameter than the inside of the supporting means, whereby adjustment of the central portion causes deformation of the unsupported part of the outer portion.

4. The adjusting means of claim 3 wherein the platform adjusting means comprises at least one adjusting screw threaded through the backing plate and bearing against the platform, whereby adjustment of the screw controls the deformation of the platform relative to the backing plate and adjusts the core relative to the diaphragm.

5. The adjusting means of claim 4, having a single adjusting screw located in approximate alignment with the center of the core.

6. The adjusting means of claim 4, having at least two adjusting screws.

7. The adjusting means of claim 4, having two adjusting screws located coplanar with the core.

8. The adjusting means of claim 4 wherein the rigid central portion of the platform holds the core in a transverse groove and is encircled by a clamping ring adapted and arranged to prevent loss of the core due to groove expansion.

9. A pressure transducer comprising a magnetic diaphragm; at least one magnetic core having at least one arm projecting towards said diaphragm and forming a magnetic circuit therewith; an electrical coil surrounding an arm of said core; a core-supporting platform having a deformable outer portion and a rigid central portion adapted to support the core; a rigid platform backing plate located opposite the core-supporting side of the platform; means for integrally supporting the diaphragm, platform, and backing plate at their peripheries; externally controllable means for adjusting the central portion of the platform relative to the backing plate whereby the spacing between the core and the diaphragm is adjusted; and means for applying a differential pressure to said diaphragm whereby the distance between said diaphragm and said core may be varied thereby varying the impedance of said coil.

10. The pressure transducer of claim 9, wherein the magnetic core is generally E-shaped, the middle arm being disposed near the center of said diaphragm.

11. The pressure tranducer of claim 10, wherein the rigid central portion of the coil-supporting platform is noticeably smaller in diameter than the inside of the supporting means, whereby adjustment of the central portion causes deformation of the unsupported part of the outer portion.

12. The pressure transducer of claim 11, wherein the platform adjusting means comprises at least one adjusting screw threaded through the backing plate and bearing against the platform, whereby adjustment of the screw controls the deformation of the platform relative to the backing plate and adjusts the core relative to the diaphragm.

13. The pressure transducer of claim 12, having a single adjusting screw located in approximate alignment with the center of the E core.

14. The pressure transducer of claim 12, having at least two adjusting screws.

15. The pressure transducer of claim 12, having two adjusting screws located coplanar with the E core.

16. The pressure transducer of claim 12 wherein the rigid central portion of the platform holds the core in a transverse groove and is encircled by a clamping ring adapted and arranged to prevent loss of the core due to groove expansion.

References Cited in the file of this patent

UNITED STATES PATENTS

| | | |
|---|---|---|
| 2,751,530 | Armstrong | June 19, 1956 |
| 2,884,608 | Jessen | Apr. 28, 1959 |